Figure 1:
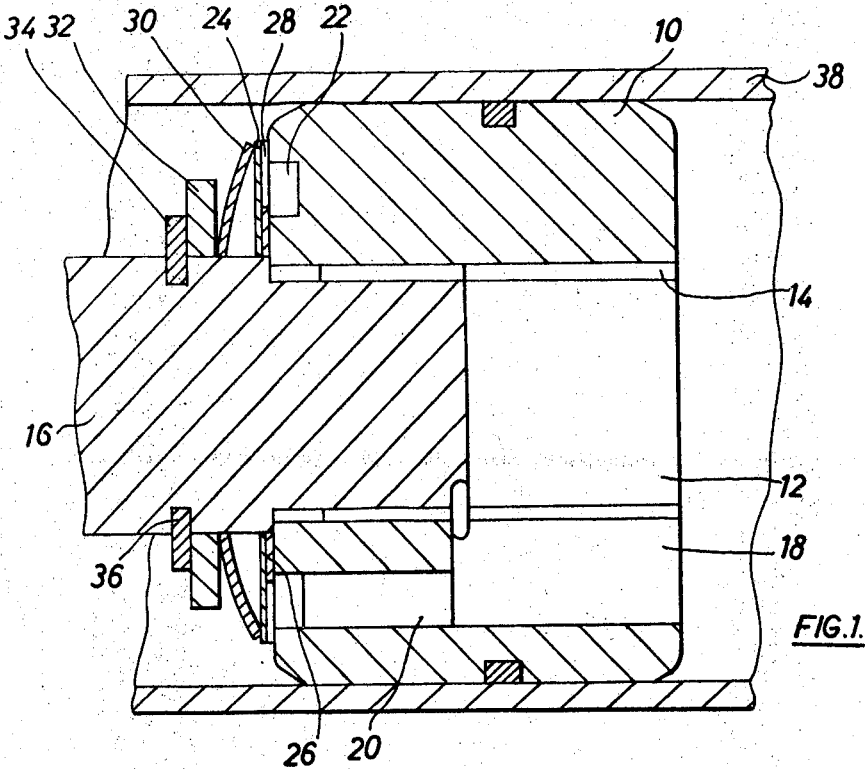

United States Patent [11] 3,552,429

[72] Inventor Ronald S. Dickinson
    York, England
[21] Appl. No. 764,774
[22] Filed Oct. 3, 1968
[45] Patented Jan. 5, 1971
[73] Assignee Armstrong Patents Co. Limited
    London, England
    a British Company
[32] Priority Oct. 5, 1967
[33] Great Britain
[31] No. 45,425/67

[54] HYDRAULIC PISTONS
    7 Claims, 4 Drawing Figs.
[52] U.S. Cl. .................................................... 137/493.8,
                                                                251/40
[51] Int. Cl. .................................................... F16k 47/10
[50] Field of Search .......................................... 137/493.8,
        512.5, 513.5, 514, 514.3, 514.5, 514.7, 493,
        493.1, 493.2, 493.3, 493.4, 493.5, 493.6, 493.7,
                            493.9, 538; 251/63.6, 48, 324

[56] References Cited
UNITED STATES PATENTS

| | | | |
|---|---|---|---|
| 149,019 | 3/1874 | Witty............................ | 137/625.68 |
| 2,183,601 | 12/1939 | White........................... | 251/40X |
| 2,697,496 | 12/1954 | McIntyre...................... | 137/493.8X |
| 2,699,844 | 1/1955 | McIntyre...................... | 137/493X |
| 3,218,023 | 11/1965 | Kirkup ......................... | 251/38 |

Primary Examiner—M. Cary Nelson
Assistant Examiner—Robert J. Miller
Attorney—Beveridge & DeGrandi ABSTRACT: The invention concerns piston assemblies, more especially for use in hydraulic dampers, and provides for this purpose a piston which is axially bored, threaded to receive a screwed piston rod and axially ported to permit fluid flow through it, the ports being opened and closed to allow the fluid flow by a valve disc mounted on the piston rod. In a modification, the end of the piston remote from the piston rod is recessed to receive a second control valve, the piston bore serving in part to define the recess, and the piston rod is provided with axial and radial passage means communicating with the piston bore and permitting fluid flow in the opposite direction under the control of said second valve.

PATENTED JAN 5 1971

3,552,429

SHEET 1 OF 2

INVENTOR:
RONALD SIDNEY DICKINSON
BY
Browne, Schuyler & Beveridge
Attorneys

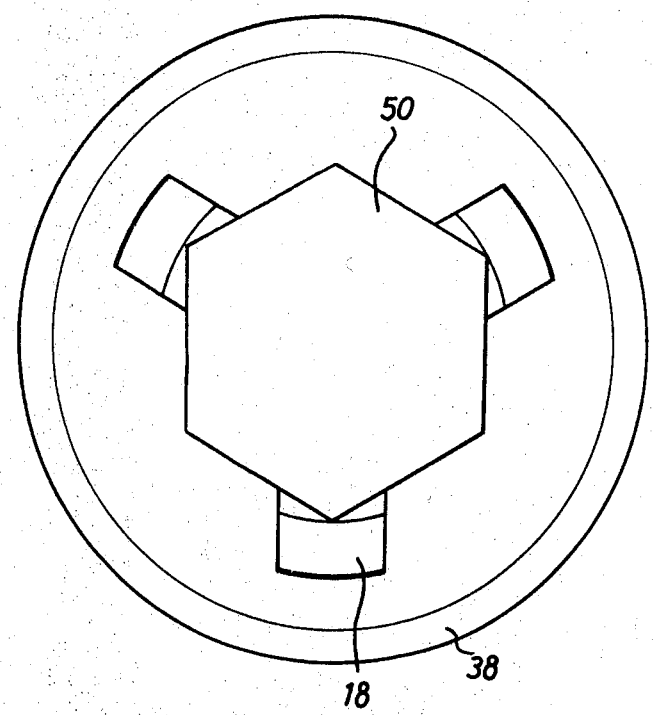
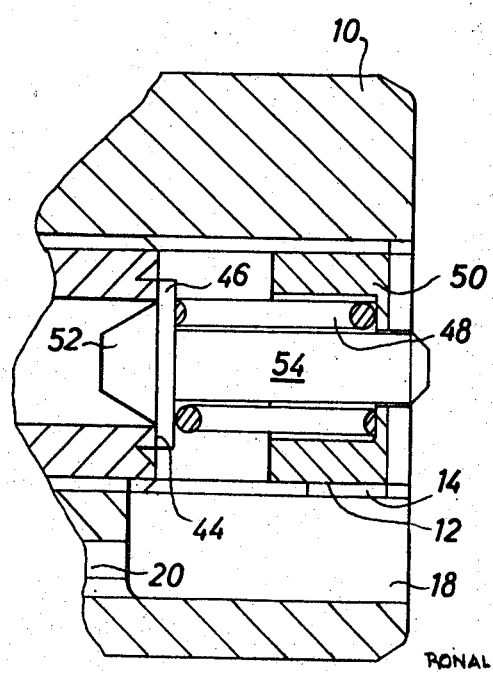

HYDRAULIC PISTONS

This invention concerns hydraulic pistons and relates more particularly to pistons for use in hydraulic dampers.

Pistons used in hydraulic dampers are often required to permit the flow of hydraulic fluid through them in one or both directions, as determined by control valves embodied in the piston, but the presence of fluid flow paths and their associated control valves can give rise to both manufacturing and operational difficulties, for example in avoiding parasitic leakages and complicated constructions intended to combat the same.

According to the present invention, a cylindrical hydraulic piston is formed with an axial bore which, at the front axial end face of said piston, opens out into a recess formed in the front face and comprising a plurality of radial branches.

Conveniently, the piston may be secured at its other or rear axial end face directly to a piston rod, preferably being screwed to such rod, and adjacent said other end face, the piston rod may provide a mounting for a control valve intended to govern the flow of hydraulic fluid in one direction through the piston. The same control valve may, if desired, be used to control hydraulic flow also in the opposite direction, but in a preferred embodiment, a separate valve is provided for this purpose and is mounted directly on the front face of the piston, as by screwing it into the recess provided in that face. This separate control valve may, with advantage, be used to control hydraulic flow along a path comprising axial and radial passages in the piston rod.

Figure 2:
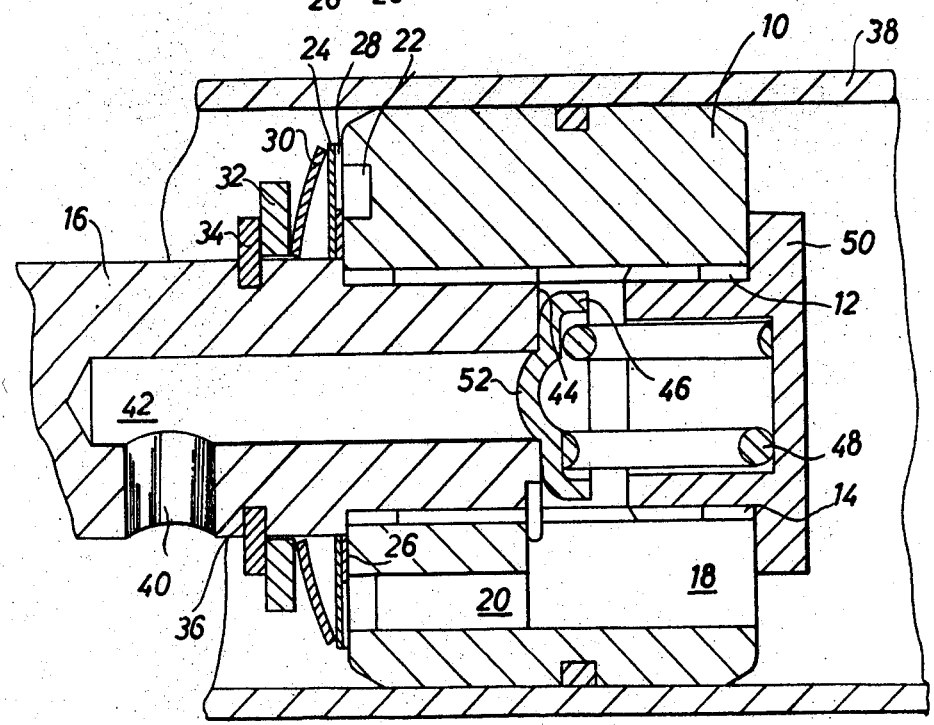

The invention will be described further, by way of example, with reference to the accompanying drawings in which:

FIG. 1 is an axial section through one embodiment of hydraulic piston in accordance with the invention, FIG. 2 is a similar section through another embodiment of the invention, FIG. 3 is a view of the front-end face of the piston shown in FIG. 2, and FIG. 4 is an axial section of a modification of the embodiment illustrated in FIGS. 2 and 3.

Referring firstly to FIG. 1 of the drawings, a piston 10 has an axial bore 12 which is threaded at 14 and screwed at its rear end face directly to a piston rod 16. The front-end face of the piston is formed with a plurality of circularly spaced and radially directed blind recesses 18 opening out from the axial bore 12 and combining with that bore to define a generally Y-shaped recess in the front face.

From its end within the piston 10, each of the recesses 18 is continued as an arcuate passage 20 which terminates at the rear face of the piston in an annular groove 22. A disc valve closure member 24 is arranged to overlie the groove 22 and is spaced from the rear end face of the piston by a washer 26 having radial peripheral notches 28. The valve closure member 26 is urged towards the rear face of the piston by a cup spring 30 passed over the piston rod 16 and the cup spring 30 is held in place by a relatively heavy washer 32 retained on the piston rod 16 by a circlip 34 seated in a circumferential groove 36 of the piston rod. It will be noted that the thickness of the washer 32 is greater than the axial depth of the groove 36, so that, during final assembly of the several valve components on to the piston rod 16, when the circlip 34 is pushed home into the groove 36, it is impossible to jam the valve closure disc 24 in that groove.

In the operation of the piston shown in FIG. 1, when arranged, for example, in a pressure cylinder 38 of a hydraulic damper, movement of the piston to the right as viewed in the drawing, in a direction to compress hydraulic fluid in the cylinder, will force hydraulic fluid under pressure through the passage 20, causing the valve member 24 to lift against the force of the spring 30. Movement of the piston in the opposite direction will urge hydraulic fluid back through the passage 20 by way of the notches 28 in the washer 26. The same notches serve to permit hydraulic flow through the piston in either direction consequent upon piston movements too small to lift the closure disc 24.

The invention thus provides a hydraulic piston which has good hydraulic efficiency since only a single valve and valve seating is employed to control the hydraulic flow through the piston and which moreover is relatively simple in assembly employing a minimum number of component parts.

The embodiment of the invention illustrated in FIGS. 2 and 3 is similar to that already described but additionally includes a radial passage 40 and communicating axial passage 42 in the piston rod 16 for permitting hydraulic fluid to flow through the piston 10, in a direction from its rear face to its front face. The axial passage 42 is surrounded at the inner end of the piston rod 16 by a valve seat 44 against which a valve closure member 46 is resiliently urged by a valve spring 48. The valve spring 48 is housed within a spring abutment in the form of a capscrew 50 which is threadedly engaged within the bore 12 of the piston. It will be noted that the valve closure member 46 is an annular cup-shaped member having a central domed portion 52 which seats within the piston rod bore 42. By virtue of this arrangement there is a minimum risk of parasitic leakage of hydraulic fluid past the valve 44,46 since the valve closure member is always centralized by the dome 52 and radial movement of the valve member across its seat 44 is prevented by the axial height of the dome 52 which ensures that said dome is always securely lodged in the bore 42.

Although not illustrated, a tab washer is positioned between the front face of the piston 10 and the capscrew 50 to prevent the latter from accidentally becoming unthreaded from the bore 12, the tab of such washer being bent to rest in one of the piston recesses 18.

In the modification of the invention shown in FIG. 4, the valve closure member 46 is carried on an axial stem 54 which extends coaxially through the valve spring 48 and is guided at its free end by an axial aperture in the capscrew 50. The valve stem 54 acts to limit the amount of tilt which can be exhibited by the valve closure member 46 and thus contributes towards stability in conditions of alternating hydraulic flow in which a resonant condition of the valve closure member and its spring 48 might otherwise arise.

I claim:

1. A hydraulic piston and rod assembly comprising in combination; a generally cylindrical piston having opposite front and rear end faces and an axial, first, passage opening into said front-end face, a rod fixed to the piston and projecting coaxially from the rear end face thereof, said piston having a number of second passages intercommunicating said first passage with said rear end face of the piston, a first fluid responsive valve means mounted on said rod for controlling flow of fluid from said first passage through said second passages outwardly beyond said rear end face, said rod having an axial passage terminating at one end at said first passage, said rod having a radial passage located outwardly of said rear end face of the piston and communicating with said axial passage in said rod, and a second fluid responsive valve means located in said first passage for controlling flow from said radial and axial passages of said rod into said first passage of said piston.

2. The piston rod assembly defined in claim 1 wherein said first passage of said piston extends throughout between said opposite front and rear end faces, and wherein said rod extends partially into said first passage, and wherein there is further included thread means located on said rod and said piston in said first passage of said piston, fixing said rod to said piston.

3. The piston and rod assembly defined in claim 1 wherein said first valve means includes an annular disc closure member received on said rod, and spring means urging said disc member on said rear end face over said second passages.

4. The piston and rod assembly defined in claim 3 wherein said second valve means includes a closure member, and spring means urging said closure member on said rod over said axial passage in said rod.

5. The piston and rod assembly defined in claim 4 further including an abutment member fixed in said first passage of said piston at said front end face of said piston, said spring means associated with said second valve means being a compression spring having one end engaging said closure member of said second valve means and an opposite end engaging said abutment member.

6. The piston and rod assembly defined in claim 3 wherein said spring means is an annular dish-shaped spring received in said rod behind said disc closure member and wherein there is further included a clip secured on said rod behind said spring and a washer interposed between said clip and said spring.

7. The piston and rod assembly defined in claim 1 wherein said second passages in said piston include a plurality of angularly spaced passages extending radially outwardly from said first passage, a plurality of angularly extending passages in said piston communicating respectively with said angularly spaced passages, and an annular passage in said rear end face of said piston communicating with said angularly extending passages.